(12) United States Patent
Pichai

(10) Patent No.: US 8,966,924 B2
(45) Date of Patent: Mar. 3, 2015

(54) PRE-COOLING CHAMBER FOR A COOLING TOWER

(75) Inventor: Tikhon Suresh Pichai, Simpsonville, SC (US)

(73) Assignee: Equinix, Inc., Foster City, CA (US)

( * ) Notice: Subject to any disclaimer, the term of this patent is extended or adjusted under 35 U.S.C. 154(b) by 503 days.

(21) Appl. No.: 12/946,598

(22) Filed: Nov. 15, 2010

(65) Prior Publication Data

US 2011/0113798 A1   May 19, 2011

Related U.S. Application Data

(60) Provisional application No. 61/260,952, filed on Nov. 13, 2009.

(51) Int. Cl.
*F28D 5/02* (2006.01)
*F28C 1/14* (2006.01)

(52) U.S. Cl.
CPC ..................................... *F28C 1/14* (2013.01)
USPC ............................................ 62/310; 62/314

(58) Field of Classification Search
USPC .............. 62/121, 309, 310, 314; 10/121, 309, 10/310, 314
See application file for complete search history.

(56) References Cited

U.S. PATENT DOCUMENTS

| | | | | |
|---|---|---|---|---|
| 1,252,472 A | * | 1/1918 | Miles ................................ | 62/95 |
| 2,247,514 A | * | 7/1941 | Mart .............................. | 261/147 |
| 2,890,864 A | * | 6/1959 | Stutz ................................. | 62/310 |
| 3,831,667 A | * | 8/1974 | Kilgore et al. ................... | 165/96 |
| 3,887,666 A | * | 6/1975 | Heller et al. ................... | 261/130 |
| 3,994,999 A | * | 11/1976 | Phelps .......................... | 261/159 |
| 4,071,080 A | * | 1/1978 | Bridgers ......................... | 165/59 |
| 4,119,140 A | * | 10/1978 | Cates .............................. | 165/67 |
| 4,315,873 A | | 2/1982 | Smith et al. | |
| 6,070,860 A | | 6/2000 | Kinney, Jr. et al. | |
| 6,213,200 B1 | | 4/2001 | Carter et al. | |
| 6,247,682 B1 | * | 6/2001 | Vouche .......................... | 261/152 |
| 6,523,604 B1 | | 2/2003 | Brooks | |
| 6,564,864 B2 | | 5/2003 | Carter et al. | |
| 6,663,087 B2 | | 12/2003 | Hubbard et al. | |
| 6,663,694 B2 | | 12/2003 | Hubbard et al. | |
| 7,128,310 B2 | | 10/2006 | Mockry et al. | |
| 7,232,116 B2 | | 6/2007 | Stratman et al. | |
| 7,234,309 B2 | | 6/2007 | Lee | |
| 7,328,886 B2 | | 2/2008 | Mockry et al. | |
| 7,364,141 B2 | | 4/2008 | Brenneke et al. | |
| 7,484,718 B2 | | 2/2009 | Facius et al. | |
| 7,603,774 B2 | | 10/2009 | Facius et al. | |
| 7,765,827 B2 | * | 8/2010 | Schlom et al. ................... | 62/309 |
| 7,887,030 B2 | * | 2/2011 | Hentschel et al. ............ | 261/109 |
| 2001/0032477 A1 | | 10/2001 | Schlom et al. | |

(Continued)

OTHER PUBLICATIONS

M.P. Maiya, Analysis of Modified Counter-Flow Cooling Towers, Heat Recovery Systems & CHP, 1995, pp. 293-303, vol. 15, No. 3, Elsevier Science Ltd.

(Continued)

*Primary Examiner* — Cassey D Bauer
(74) *Attorney, Agent, or Firm* — Barnes & Thornburg LLP

(57) ABSTRACT

An apparatus and method for cooling a fluid are disclosed. The apparatus includes a pre-cooling chamber and a main tower in a generally side-by-side configuration. A cooling fluid flows generally transversely through the pre-cooling chamber and the main tower in order to cool the fluid to be cooled.

18 Claims, 3 Drawing Sheets

(56) References Cited

U.S. PATENT DOCUMENTS

| | | | |
|---|---|---|---|
| 2003/0033821 A1* | 2/2003 | Maisotsenko et al. | 62/94 |
| 2007/0151278 A1 | 7/2007 | Jarvis | |
| 2009/0178426 A1* | 7/2009 | Bhatti et al. | 62/304 |

OTHER PUBLICATIONS

International Search Report for International Application PCT/US2010/056720, mailed Jan. 14, 2011.

* cited by examiner

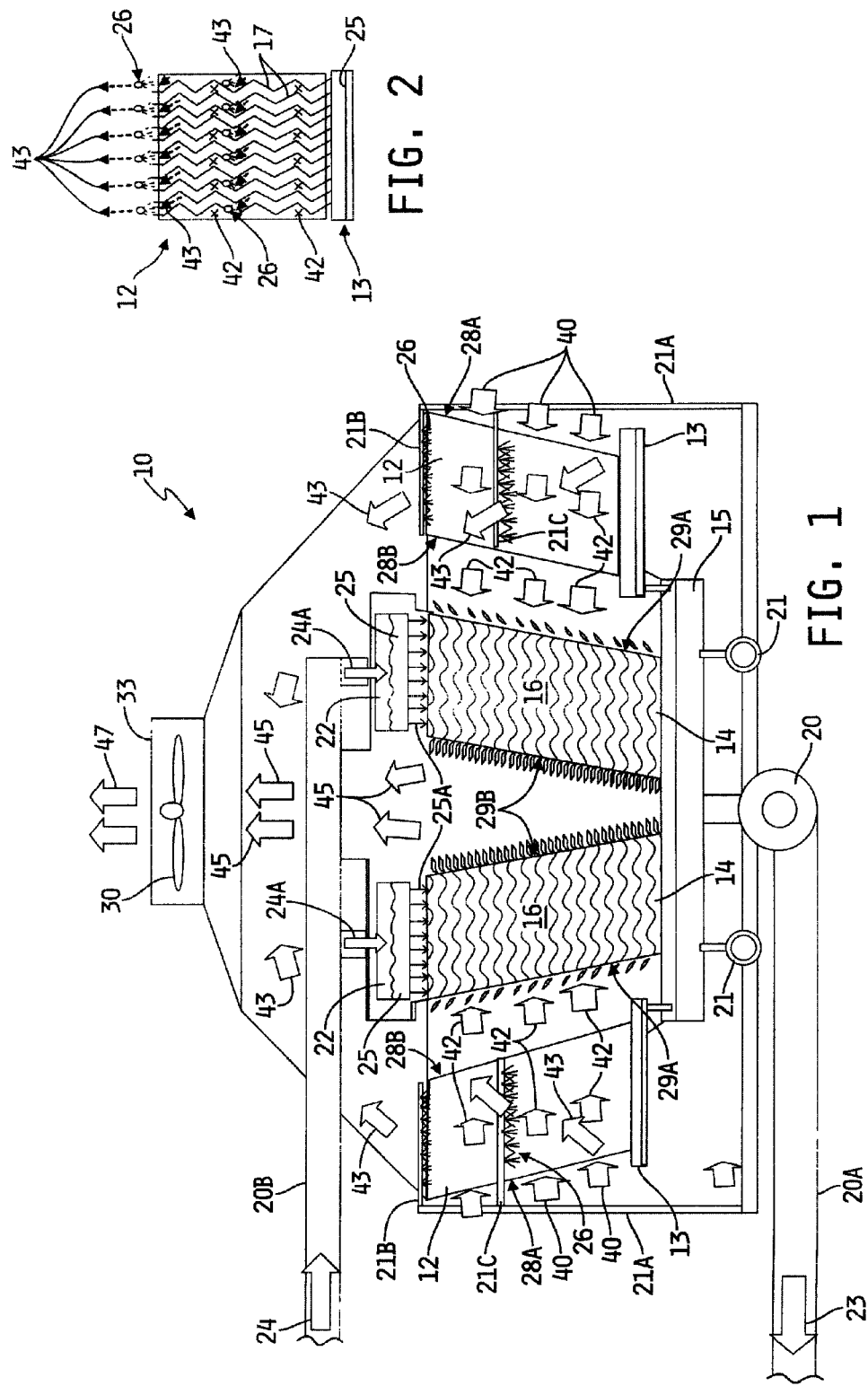

PRE-COOLING CHAMBER FOR A COOLING TOWER

CROSS REFERENCE TO RELATED APPLICATIONS

This application claims priority to and the benefit of U.S. Provisional Patent Application No. 61/260,952, filed 13 Nov. 2009, the disclosure of which is now incorporated herein by reference.

FIELD OF THE INVENTION

The present invention relates generally to cooling towers, and more specifically to a cooling tower that cools a fluid in stages.

BACKGROUND AND SUMMARY OF THE INVENTION

Cooling towers are known. Illustrative examples of conventional cooling towers are found in U.S. Pat. No. 7,364,141, dated Apr. 29, 2008, and U.S. Pat. No. 7,484,718, dated Feb. 3, 2009, the disclosures of each of which are now incorporated herein by reference. In addition to the foregoing patents, a paper entitled Analysis of Modified Counter-Flow Cooling Towers by M. P. Maiya, found in *Heat Recovery Systems &CHP*, Vol. 15, No. 3, pp. 293-303 (1995), describes relevant aspects of evaporative cooling towers and is now incorporated in its entirety herein by reference and was submitted as an exhibit to the priority provisional application. What is needed is a more efficient cooling tower.

The present invention may comprise one or more of the following features and combinations thereof:

A method of cooling a fluid is disclosed comprising the steps of:

drawing a cooling fluid through an inlet and into a pre-cooling chamber;

delivering a pre-cooling fluid generally downwardly and cross-wise to the flow of the cooling fluid;

drawing the cooling fluid through a pre-cooling chamber;

drawing the cooling fluid out from the pre-cooling chamber and generally across into a main cooling tower; and delivering a fluid to be cooled generally downwardly in a cross-wise fashion to the flow of the cooling fluid through the main tower.

An illustrative apparatus for cooling a fluid is disclosed. The apparatus generally comprises a pre-cooling chamber in side-by-side relation to a main tower. The apparatus further comprises one or more of the following elements and features alone or in combination: The pre-cooling chamber includes an inlet side and an outlet side opposite the inlet side. The main tower includes an inlet side and an outlet side opposite the inlet side. A main sump is disposed generally below and in fluid communication with the main tower. The main sump is also disposed generally below and in fluid communication with the pre-cooling chamber. A spray pump is in fluid communication with the main sump. A series of spray fluid piping is in fluid communication with the spray pump and with the pre-cooling chamber. A fluid reservoir is disposed generally above and in fluid communication with the main tower. The pre-cooling chamber outlet side and the main tower inlet side are disposed in a generally side by side relationship in fluid communication with one another. The fluid outlet and the pre-cooling chamber are in fluid communication with one another. The fluid outlet and the main tower are in fluid communication with one another. The pre-cooling chamber is configured to pre-cool a cooling fluid flowing therethrough from the pre-cooling chamber inlet side generally transversely across to the pre-cooling chamber outlet side through a heat exchange with a pre-cooling fluid spray delivered generally downwardly and perpendicular to the transversely flowing cooling fluid. The pre-cooling chamber and the main tower are positioned to allow the cooling fluid to flow generally transversely between the pre-cooling chamber outlet side and the main tower inlet side; wherein the main tower is configured to allow the cooling fluid to flow therethrough from the main tower inlet side generally transversely across to the main tower outlet side in order to cool a fluid to be cooled delivered from the fluid reservoir generally downwardly and perpendicular to the generally transversely flowing cooling fluid. A fluid outlet is disposed generally above the main tower and the pre-cooling chamber. The fluid outlet is configured to draw the cooling fluid therethrough.

In another illustrative embodiment, the apparatus may further comprise a circulating pump in fluid communication with the main sump. A fluid delivery pipe is in fluid communication with the circulating pump. A fluid return pipe is in fluid communication with the fluid reservoir.

In another illustrative embodiment two pairs of pre-cooling chambers and main towers are disclosed. The second pair of pre-cooling chamber is in fluid communication with spray fluid piping. The spray fluid piping is in fluid communication with the spray pump and/or another spray pump as desired. Each pre-cooling chamber may be in fluid communication with an auxiliary sump.

In another illustrative embodiment an auxiliary heat exchanger system has one end disposed generally above the pre-cooling chamber and an opposing end disposed generally above the main tower in fluid communication with that pre-cooling chamber. The auxiliary heat exchanger system may comprise a heat pipe system. The auxiliary heat exchanger system may comprise a run-around coil system.

These and other objects of the present invention will become more apparent from the following description of the illustrative embodiment.

BRIEF DESCRIPTION OF THE DRAWINGS

The detailed description particularly refers to the following figures, in which:

FIG. 1 depicts a partial view of an illustrative cooling tower; and

FIG. 2 depicts an enlarged cross section of a heat exchanger of the illustrative cooling tower.

DESCRIPTION OF THE ILLUSTRATIVE EMBODIMENTS

Figure 3:
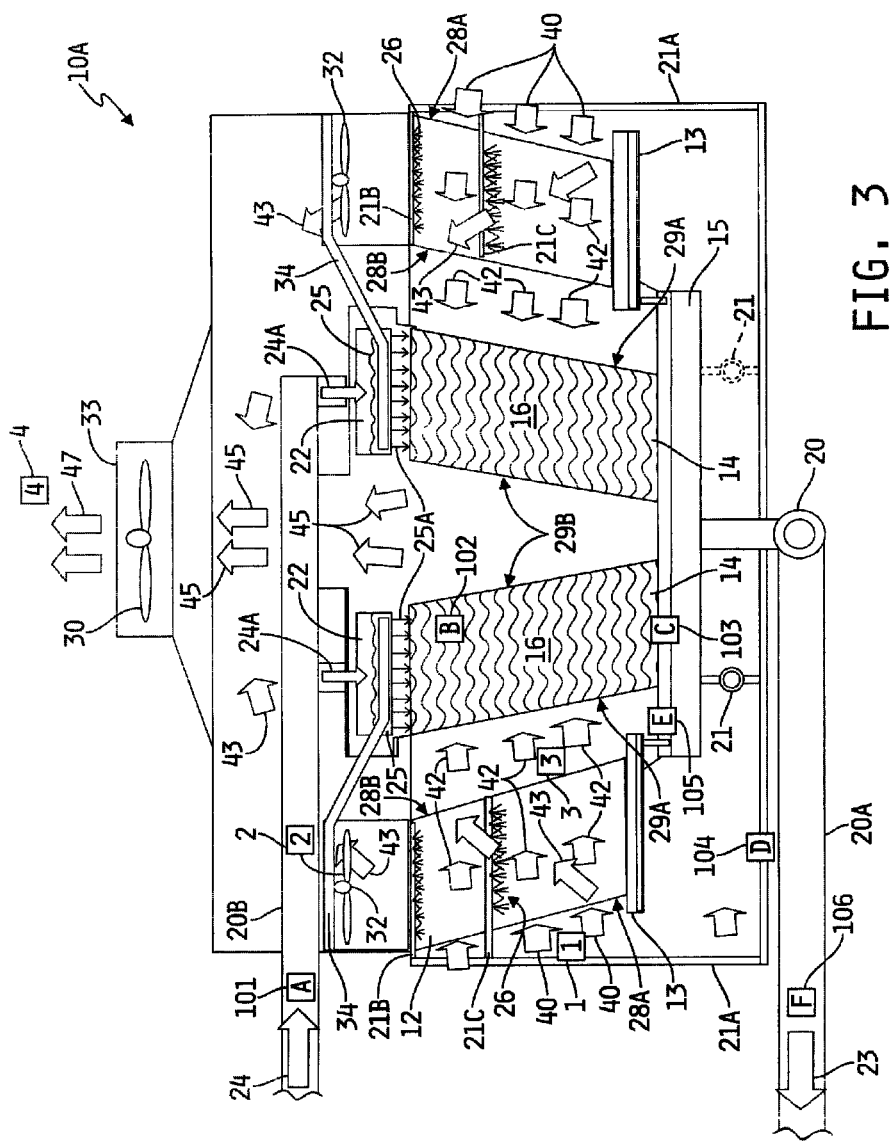
FIG. 3 depicts a partial view of another illustrative cooling tower.

For the purposes of promoting an understanding of the principles of the invention, reference will now be made to a number of illustrative embodiments illustrated in the drawing and specific language will be used to describe the same. While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Referring to the Figures, an illustrative cooling tower or apparatus 10, 10A is depicted. The illustrative cooling tower 10, 10A is adapted to cool a fluid. The fluid could be for example a liquid, such as for example and without limitation water, or a gas, such as for example and without limitation air. The illustrative cooling tower 10, 10A illustratively and generally comprises one or more center or main cooling tower(s) 14 and one or more heat exchanger(s) 12 or pre-cooling chamber(s) 12. The illustrative cooling tower for example and without limitation comprises two center or main cooling towers 14 and two heat exchanger(s) 12. It will be appreciated that the cooling tower 10, 10A illustratively could comprise a single main tower 14 in combination with a single pre-cooling chamber. The main cooling tower(s) 14 illustratively is of conventional construction and is in fluid communication with a respective fluid reservoir(s) 22 disposed generally above the main tower(s) 14 and a fluid sump, main basin or main sump 15 disposed generally below the main tower(s) 14. The main sump 15 may also be disposed generally below the pre-cooling chamber(s) 12. The main tower 14 may be for example and without limitation a conventional mechanical induced draft cooling tower or any other suitable cooling tower. For example, the main cooling tower(s) 14 is an evaporative cooling tower having conventional fill media 16 for cooling as will be explained. The fill 16 may be for example and without limitation a plurality of plastic sheets of suitable size and shape, for example a wavy shape, as known to those skilled in the art. For example, the sheets may illustratively comprise polyvinyl chloride or polypropylene or other suitable material. The main tower(s) 14 comprises an inlet side(s) 29A and an opposing outlet side(s) 29B. The inlet side(s) 29A and the outlet side(s) 29B are generally vertically extending and generally parallel to one another. The inlet side(s) 29A define an inlet into the main tower(s) 14 and the outlet side(s) 29B define an outlet out of the main tower(s) 14. The pre-cooling chamber(s) comprises an inlet side(s) 28A and an opposing outlet side(s) 28B. The inlet side(s) 28A and the outlet side(s) 28B are generally vertically extending and generally parallel to one another. The inlet side(s) 28A define an inlet into the pre-cooling chamber(s) 12 and the outlet side(s) 28B define an outlet out of the pre-cooling chamber(s) 12. The illustrative fluid reservoir(s) 22 may hold a fluid to be cooled 25, 25A such as for example and without limitation water 25. One or more circulating pump(s) 20 and one or more spray pump(s) 21 may be in fluid communication with the main sump 15. The circulating pump(s) 20 illustratively is in fluid communication with fluid delivery pipe 20A and with main sump 15. Spray pump(s) 21 is in fluid communication with a series of spray fluid piping 21A, 21B, 21C and with main sump 15. The one or more heat exchanger(s) 12 or pre-cooling chamber(s) 12, which also may be of any suitable conventional construction, illustratively are in fluid communication with respective heat exchanger or auxiliary basin(s) 13 also referred to as auxiliary sump(s) 13. The auxiliary sump(s) 13 illustratively is in fluid communication with the main sump 15 and with respective pre-cooling chamber(s) 12, disposed generally therebelow. The heat exchanger(s) or auxiliary coolers or pre-cooling chambers 12 illustratively are side heat exchangers disposed generally to the side of and adjacent to the respective main tower 14. More specifically, the pre-cooling chamber outlet side 28B and the main tower inlet side 29A of each respective pre-cooling chamber 12 and main tower 14 pair are disposed in a generally side-by-side relationship to one another and are in fluid communication with one another. The main tower(s) 14 and the side heat exchanger(s) 12 are in fluid communication with one another. Illustratively, the auxiliary heat exchangers or coolers are configured to pre-cool a fluid prior to further cooling in the main tower(s) 14 as will be explained. The cooling tower 10, 10A may include a fan 30. The fan 30 may be for example and without limitation a medium pressure, induced draft fan. As best seen in FIG. 2, the heat exchanger(s) 12 illustratively comprise heat exchange elements 17, disposed generally above the side or auxiliary sump(s) 13. The heat exchanger(s) 12 may be any suitable heat exchanger having heat exchange elements 17. For example and without limitation the heat exchanger(s) 12 may be a fluid-to-fluid heat exchanger, such as for example a liquid-to-gas heat exchanger, or it could be a plate and frame heat exchanger. In the case of a liquid-to-gas heat exchanger, the elements could be for example and without limitation conduits or coils or other suitable elements in which a suitable fluid, such as for example and without limitation water or other coolant could be circulated through finned pipes running through the heat exchanger.

In the illustrative embodiment of FIG. 2, a plate and frame heat exchanger is depicted wherein a number of generally vertical plates or exchange elements 17 are arranged in a frame. Illustratively, one example of a suitable plate and frame heat exchanger 12 comprises a plurality of plates 17 having alternating openings or open passages and closed areas or blocked passages. The alternating openings illustratively allow the cooling fluid 40, also referred to as inlet air 40 to proceed generally transversely through the pre-cooling chamber 12, exiting the outlet side 28B as pre-cooled cooling fluid 42 and entering generally transversely into the inlet side 29A of the main tower(s) 14 as will be explained. The closed areas or blocked passages illustratively block the outside cooling fluid or inlet air 40 from proceeding transversely through to the pre-cooling chamber to the main tower 14. Rather, the blocked air proceeds upwardly toward the fluid outlet 33 and is cooled directly by pre-cooling fluid 26 also known as pre-cooling spray 26 as it proceeds upwardly towards the air outlet 33 as cooling fluid that is now cooled saturated air 43. As will be further explained, the portion of cooling fluid or air 40 that passes transversely through the pre-cooling chamber(s) 12 to the tower(s) 14 is sensibly cooled, in that the pre-cooled cooling fluid or air 42 and the pre-cooling fluid or spray 26 are kept separate or isolated from one another, as for example by baffles or gaskets or the like. Thus, the pre-cooling fluid or spray 26 contacts and cools one side of the plates 17 and the portion of the blocked inlet cooling fluid or air 40 that is directly pre-cooled thereby to become moist cooling fluid or air 43, while the unblocked portion of the outside cooling fluid or air 40 that proceeds transversely through the pre-cooling chamber contacts the opposite side of the plates 17 while avoiding direct contact with the pre-cooling fluid or water 26. Illustratively, the directly pre-cooled cooling fluid or air 43 is cooler relative to the inlet cooling fluid or air 40, but also relatively more saturated or moist due to the direct cooling that transpires in the pre-cooling chamber(s) 12. In contrast, the pre-cooled cooling fluid or air 42 is also cooler relative to the inlet cooling fluid or air 40, but relatively drier compared to the pre-cooled cooling fluid or air 43 due to the indirect or sensible cooling that transpires in the pre-cooling chamber(s) 12.

Illustratively, a cooling fluid, such as for example and without limitation outside or inlet air 40, 42, 43, is drawn into the cooling tower apparatus 10, 10A. The fan 30 may aid in drawing the cooling fluid 40 into the cooling tower 10, 10A. The cooling fluid or air 40 is drawn through the one or more heat exchangers 12. Illustratively, the heat exchanger(s) 12 is disposed or positioned generally adjacent to and prior to its respective main tower(s) 14 in a generally side-by-side configuration such that the cooling fluid or air 40, 42 is drawn generally transversely across or through the heat exchanger and generally transversely across or through the main tower(s) 14. As apparent in FIGS. 1 and 2, the pre-cooling chamber(s) 12 heat exchanger(s) 12 or auxiliary cooler(s) 12 is prior to and generally in line with the main cooling tower(s) 14 such that the flow of the portion of the fluid 40 to be sensibly cooled 42 follows generally one path generally transversely through each of the respective main tower(s) 14 and the auxiliary cooler(s) 12 in a generally parallel and transverse flow therethrough each main tower 14 and pre-cooling chamber 12 pair, such transverse or parallel flow being generally perpendicular to the generally downwardly flow of pre-cooling fluid or spray 26 in the pre-cooling chamber(s) 12 and the downwardly flow of the fluid to be cooled 25, 25A in the main tower(s) 14 respectively thereby setting up a substantially cross-flow configuration or cross-wise flow. So, the main tower(s) 14 and the pre-cooling chamber(s) or auxiliary heat exchanger(s) 12 are disposed relative to one another on generally the same horizontal plane in profile as opposed to directly below or above one another in a vertical plane or arrangement. Portions of the cooling fluid or inlet air 40 thereby become pre-cooled cooling fluid or air 42 that illustratively proceeds to respective main cooling tower(s) 14 as described herein. As will be explained, this pre-cooled cooling fluid or air 42 proceeds generally transversely across and through the main tower(s) 14, cools the fluid 25 and exits as relatively warm and saturated air 45. As noted, other portions of inlet cooling fluid or air 40 are drawn generally upwardly away from the pre-cooling chamber(s) 12 or heat exchanger as cold or pre-cooled saturated or moist cooling fluid or air 43. As will be appreciated by those skilled in the art, fan 30, while not necessary, may assist the movement of the fluid, gas or air 40, 42, 43, 45 throughout the apparatus 10, 10A. The cold saturated cooling fluid or air 43 and the warm saturated air 45 illustratively mix to form exhaust or outlet air 47, which is or may be drawn upwardly in part by the fan 30 and expelled out of the cooling tower or apparatus 10 through fluid outlet 33. The outlet air 47 is relatively warm and moist compared to pre-cooled cooling air 42, but may be relatively cooled compared to inlet cooling fluid 40. It will be appreciated that, rather than being expelled directly to for example the atmosphere, this outlet air 47 or a portion thereof could be used to pre-cool incoming air 40. For example and without limitation the outlet air 47 and/or the cold saturated air 43 could be used in some type of air-to-air heat exchanger to pre-cool the inlet air 40 as explained for example and without limitation in the Maiya reference. It will be appreciated that the operation of natural drafts, convection and the like could also draw the air 40, 42, 43, 45, 47 into, through and out of the cooling device 10, 10A without the aid of or in addition to a fan 30. So, too, additional draft fans, for example the illustrative pre-cooler fan(s) 32 (FIG. 3), and/or driving fans could be used alone or in combination as will be appreciated by those skilled in the art.

Illustratively, a fluid to be cooled, for example and without limitation water 25, 25A is delivered or returned to reservoir(s) 22, through circulating fluid to be cooled return piping or pipe 20B as indicated by circulating fluid to be cooled return arrows 24, 24A. From the fluid reservoir(s) 22, the fluid to be cooled 25, 25A is delivered, sprayed or distributed to the main tower(s) 14. The water or fluid to be cooled spray 25A illustratively runs down through the fill 16 generally vertically between the fluid outlet 33 and the inlet sides 28A, 29A of inlet cooling fluid 40, 42 for each main tower 14 resulting in evaporative cooling by the cross-flowing pre-cooled outside air 42. More specifically, the fluid to be cooled spray 25A is delivered downwardly from the reservoir(s) 22, through the fill media 16 and collected in the main sump 25 generally in a cross-flow relationship with the cooling fluid 42 which flows generally transversely through the main tower(s) 12 from inlet side 29A to outlet side 29B. Incorporated U.S. Pat. No. 7,364,141, and U.S. Pat. No. 7,484,718, as well as the incorporated Maiya reference describe pertinent aspects of evaporative cooling.

The resulting fluid to be cooled 25, 25A or water is collected in the main sump 15 as now cooled circulating cooling fluid or water 23. The tower main pump 20 draws the circulating cooling fluid 23 away from the sump 15 through supply piping or fluid delivery pipe 20A and illustratively delivers it as indicated generally by the circulating cooling fluid supply arrow 23 to for example and without limitation a heat exchanger (not shown), a chiller plant (not shown), or the like for cooling of an item such as for example a structure such as for example and without limitation a building, a room, or a piece of equipment or other cooling load. The invention contemplates improving chiller plant efficiency through for example the reduced condenser water temperatures and/or the optimizing the use of waterside economizer operations. The invention further contemplates such efficiencies that the use of chillers can be eliminated altogether. It will be appreciated that additional pumps or means, such as for example, gravity, may be used to deliver the circulating cooling fluid or water 23 or other cooled fluid to the cooling device or cooling load (not shown). After the cooling load, the now relatively warmer fluid to be cooled 24 is returned to the reservoir(s) 22 through fluid return pipe or piping 20B as indicated by water return arrows 24, 24A.

Auxiliary or spray pump 21 illustratively draws cooling fluid from the main sump or basin 15 and distributes it via spray fluid piping 21A to provide pre-cooling fluid or spray 26 through for example and without limitation nozzles. Such pre-cooling fluid or spray 26 can occur at one or more locations in the heat exchanger(s) or pre-cooling chamber(s) 12, but illustratively is configured to flow downwardly between the fluid outlet 33 and the inlet side 28A for the outside cooling fluid or air 40 until it is collected in the auxiliary or side sump(s) or basin(s) 13. More specifically, the fluid spray 26 illustratively flows out of spray piping 21B, 21C downwardly through the heat exchanger(s) 12 in a cross-flow manner with respect to the generally flow-through path of the cooling fluid 42, and is collected in the heat exchange sump 13, also known as an auxiliary basin or side sump 13. The cooling fluid or spray 26 illustratively contacts and cools one side of the plates 17, which in turn cool, sensibly, the generally flow-through cooling fluid 42 portion of the inlet cooling fluid 40. The cooling fluid or spray 26 illustratively directly or latently cools the cooling fluid 43 that flows generally upward toward the fluid outlet 47 through the pre-cooling chamber(s) 12 because it is blocked from flow-through. Illustratively, the side or auxiliary sump 13 may but need not feed into the main sump 15. For example, one or more pumps 21 could access the side sump(s) 13 directly. Those skilled in the art will understand that one or more than one pump 21 may be utilized, for example a separate pump to provide the pre-cooling fluid spray 26 to the illustrative one or more locations served respectively by spray piping 21B and 21C in the pre-cooler(s) or pre-cooling chamber(s) 12. For example, FIG. 3 depicts two pumps 21, one of which is in phantom to show that it may or may not be used. The pre-cooling fluid 26 may also come from other supply means, for example and without limitation directly out of reservoir(s) 22, directly from fluid return pipe 20B, or directly out of the side or auxiliary sump(s) 13, or any combination of the above as desired and appropriate to provide the pre-cooling fluid or spray 26. As noted, the pre-cooling fluid 26, for example and without limitation water, in the pre-cooling chamber(s) 12 proceeds generally downwardly through the pre-cooling chamber(s) 12 and is collected in the auxiliary or side sump(s) 13.

Illustratively, in operation, outside or ambient cooling fluid or air 40 enters the tower 10, 10A through the inlet side(s) 28A of the pre-cooling chamber(s). Illustratively, the outlet side(s) 28B of the pre-cooling chamber(s) 12 is in fluid communication with the inlet side(s) 29A of the respective main cooling tower(s) 14. Effectively there is substantially a single path for the pre-cooled portion of the cooling fluid 42 through each respective pre-cooling chamber 12 and main cooling tower 14 pair that is disposed in side-by-side relation. As noted, the pre-cooled portion of the cooling fluid 42 of the incoming outside air or cooling fluid 40 illustratively is sensibly cooled as known to those skilled in the art, while the other pre-cooled portion of the cooling fluid 43 is directly cooled and exits the pre-cooling chamber(s) 12 as cooled saturated fluid 43 rather than entering the main tower(s) 14. Generally, during sensible pre-cooling, the moisture content of the cooling fluid or air 42 remains essentially constant, but its temperature decreases as it flows over the cooling elements for example a cooling coil or the illustrative cooling plates 17. The surfaces of the cooling coil/plate 17 should be dry and their surface temperature should be greater than the dew point temperature of air. Illustratively, the sensible heat transfer is from the cooling fluid or air 42 to the water.

The sensibly cooled cooling fluid 42, which illustratively has a lower wet bulb temperature relative to the outside fluid 40, illustratively flows out from the pre-cooling chamber(s) 12 generally and substantially transversely into and through the main cooling tower(s) 14. Thus, the sensibly pre-cooled cooling fluid or air 42 may be thought of as pre-cooled tower inlet cooling fluid or air 42. Cooling tower main sump 15 fluid to be cooled 25, 25 is sprayed 25A illustratively to be cooled evaporatively by the pre-cooled cooling fluid 42 as it flows generally transversely through the main tower 14. The main tower operation is enhanced by the use of the pre-cooled cooling fluid 42, for example and without limitation because the illustrative fluid 42 has a lower wet bulb temperature. Illustratively, the sensibly pre-cooled cooling fluid's dry bulb temperature may approach the ambient wet bulb temperature. Illustratively, the sensibly pre-cooled cooling fluid's wet bulb temperature may be depressed. For example and without limitation the pre-cooled wet bulb temperature of the cooling fluid 42 may be depressed about one degree per three degree reduction in dry bulb temperature. Decreasing the wet bulb temperature of the sensibly pre-cooled cooling fluid 42 entering the main tower(s) 14 illustratively improves the efficiency or cooling capacity of the tower(s) 14. In certain conditions, it is possible for the main cooling tower fluid to be cooled 25 to attain temperatures below the ambient wet bulb temperature. Illustratively, only sensibly pre-cooled cooling fluid 42 enters the main tower(s) 14. While ambient air generally is not directly introduced into the tower(s) 14, those skilled in the art will understand that, generally, in the main tower(s) 14, cooling and humidification is happening such that sensible heat transfer is from the air to the water and latent heat transfer is from the water to the air. Illustratively, the temperature of the water should be lower than the dry-bulb temperature of the air, but higher than its dew-point temperature. Some losses of fluid to be cooled 25 due to evaporation may be expected such that the invention contemplates the use of replacement fluid or water as necessary.

Generally, cooling tower performance is dependent on heat transfer surface area, the dry bulb temperature difference between the fluid to be cooled and the cooling air, and the wet bulb temperature of the cooling air. For example, a cooling tower with infinite surface area and infinite air flow could produce cooled fluid at the wet bulb temperature of the air, and no lower. With other factors constant, cooling air with lower wet bulb temperatures will result in better cooling tower performance. The invention illustratively lowers the wet bulb temperature of the incoming cooling fluid or air 40 by indirectly, sensibly, pre-cooling it 42 by evaporating a portion of the cooled fluid 26 from the cooling tower sump 15. The dewpoint of the pre-cooled cooling air 42 remains the same, but as the air state point moves along the same dewpoint line to a lower wet bulb temperature prior to entering the main cooling tower inlet its temperature is lowered and it is pre-cooled. This lower wet bulb air illustratively enhances the tower cooling performance producing a lower temperature cooled fluid 23, 26 in the sump 15. It will be appreciated that a cooling tower 12/precooler 14 with infinite surface area and infinite air flow could produce cooled fluid at the dewpoint temperature of the air, and no lower.

Referring to FIG. 3, another illustrative embodiment 10A of the invention is depicted. While this other embodiment 10A is substantially similar in construction and operation to the embodiment 10 of FIG. 1 described above, it further comprises a pre-cooler fan 32 associated with each pre-cooling chamber 12, as well as an associated run-around coil heat exchange system 34, or, alternately, a heat pipe heat exchange system 34. Illustratively, the heat pipe 34 comprises an evacuated metallic coil at least partially filled with a fluid, such as for example and without limitation a refrigerant such as for example a glycol mixture. The heat pipe 34 illustratively spans between the pre-cooling chamber 12 and the respective fluid reservoir 22 with one end disposed generally above and in fluid communication with the respective pre-cooling chamber, and an opposing end disposed generally above the respective main tower 14 and generally below the respective reservoir 22 and in fluid communication with the respective reservoir 15, main tower 14 and pre-cooling chamber 12. Similarly, a similarly positioned run-around coil 34 could be used in addition to or instead of a heat pipe. Illustratively, the run-around coil generally comprises a pipe filled with a fluid, such as for example and without limitation water. A pump illustratively would circulate the fluid back and forth between the opposing ends respectively disposed above respective heat exchanger 12 and respective cooling tower 14 as depicted in FIG. 3 and as described with respect to the heat pipe.

Figure 4:
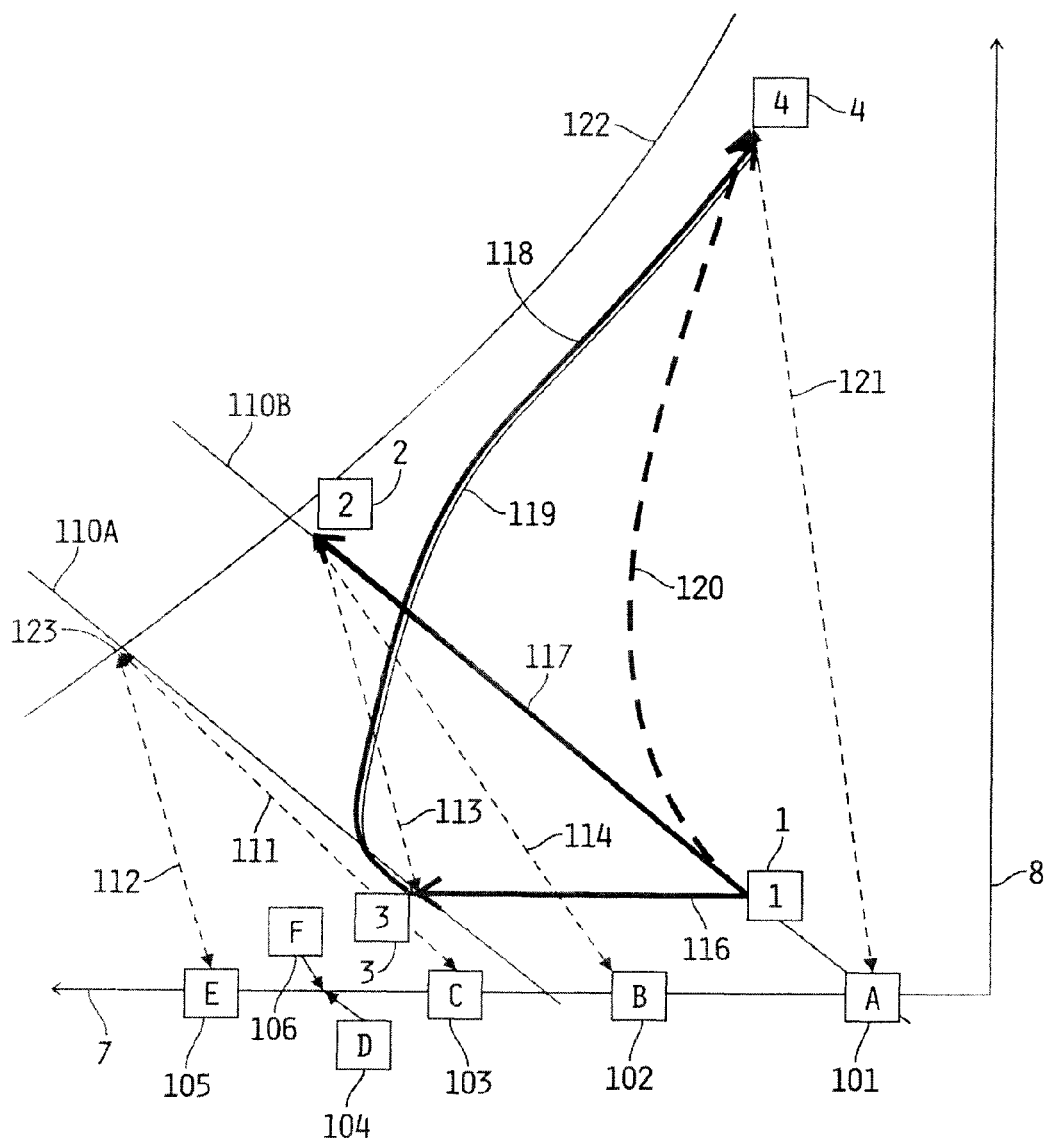
FIG. 4 is an illustrative psychrometric graph of the illustrative cooling tower.

In operation, the latently pre-cooled cooling fluid or air 43 exhausting at the top of the pre-cooling chamber(s) 12 illustratively and generally at point "2" 2 in FIG. 3 is relatively cooler than the basin fluid 25 exiting the reservoir 22 generally at point "B" 102 and as thermodynamically represented at point "2" 2 and point "B" 102 on FIG. 4. In the illustrative case of a heat pipe 34, refrigerant vapors illustratively rise through the heat pipe from the end disposed under the reservoir 22 and move toward and condense at the end of the pipe disposed generally above the pre-cooling chamber 12, where they are cooled by the rising pre-cooled cooling fluid 43, and then flow back to the end disposed generally under the reservoir 22 such that the fluid to be cooled 25, 25A passing over the end is pre-cooled resulting in lower the water temperature in the vicinity of point "B" 102. The cycle then repeats within the heat pipe 34. In the case of a run-around coil 34, the substantially the same pre-cooling cycle would occur, but a pump illustratively would circulate the cooling fluid between the end near point "2" 2 and the other end near point "B" 102 in order to pre-cool the fluid to be cooled 25. In either case, a pre-cooler fan(s) 32 may be used to draw the pre-cooled cooling fluid or air 43 over the heat pipe/run-around coil 34 to cool the fluid therein prior to proceeding over the tower piping 20B to pre-cool the fluid 25 in the circulating fluid to be cooled 24 flowing through the fluid return pipe 20B and/or as drawn upwardly by convection and/or the tower fan 30.

Referring to FIG. 4, an illustrative psychrometric chart for a given atmospheric pressure, for example standard atmospheric pressure, is depicted. The horizontal or x-axis 7 illustratively is the dry bulb temperature (for example, degrees F.) and the vertical or y-axis 8 illustratively is humidity ratio (for example, pounds moisture per pound dry air), which is a measure of moisture content of the illustrative air. For example, it represents the weight of the water contained in the air per unit of dry air. Unlike relative humidity, the humidity ratio is not dependent upon the temperature of the air. The dry bulb temperature is the temperature typically measured by a dry thermometer sensor tip, and illustratively increases on the chart moving from left to right towards the y-axis, with lines of constant temperature running vertically up the chart. The humidity ratio increases from bottom to top moving upwardly away from the x-axis, with lines of constant humidity ratio running horizontally across the chart. Relative humidity is represented on a psychrometric chart as a curving line running from left to right up through the chart. Relative humidity is an indicator of how much moisture is in the air compared to how much moisture the air can hold at a particular temperature. The upper curved boundary of line 122 represents saturated air or 100 percent moisture holding capacity; i.e., 100% humidity for any given temperature. Generally, warmer air can hold more water or moisture than colder air. Thus, when air is cooled, its relative humidity would increase until saturation is reached, resulting in condensation. The wet bulb temperature, which is the temperature measured when air is circulated past a wetted sensor tip, represents the temperature at which water evaporates and brings the air to saturation, assuming no loss or gain in heat by the air. The wet bulb temperature 123 is determined by following lines of constant enthalpy 110A, 110B, which would run downwardly from left to right across the chart, to the intersection with the saturation temperature boundary line 122. Enthalpy is expressed as BTU per pound of dry air. It is the heat energy content of moist air. Illustratively, the lines of constant enthalpy and constant wet-bulb temperature are the same on the chart, but the values would be read off of separate scales. The intersection of a dry bulb temperature vertical line (none are depicted) and a wet bulb diagonal line 110 may be known as a "state point" for the measured air as seen for example in points "1" 1, "2" 2, "3" 3 and "4" 4 (though no wet bulb line is shown). Those skilled in the art will appreciate that more accurate charts would use slightly different lines for wet-bulb temperature and enthalpy. Therefore, the chart depicts the relative wet bulb line(s) 110A, 110B, 111 and 112, 113 and 114. Line 116 and line 118 relatively represent cooling tower 10, 10A with a pre-cooling section as compared to line 120 representing a cooling tower which lacks a pre-cooler section. Line 122 shows a relative humidity line, with relative humidity lower in the regions below the line and higher in regions above the line. The points represented on the chart generally correspond to the relative state of cooling fluids, e.g., air, at points represented by like reference numerals throughout the illustrative cooling tower(s) 10, 10A in FIG. 3. The relative temperatures of the fluids to be cooled, e.g., water, are also depicted as letters illustratively in FIG. 3 and superimposed on the x-axis 7 for illustration purposes. Generally, (Enthalpy of the fluid (e.g., air) at point "4" 4—Enthalpy of the fluid (e.g., air) at point "3" 3)×mass flow rate of the fluid (e.g., air) at point "3" 3=(Enthalpy of the fluid (e.g., water) at point "A" 101—Enthalpy of the fluid (e.g., water) at point "B" 102)×the mass flow rate of the fluid to be cooled (e.g., water) (conventional tower portion). Fluid (e.g., air) 43 from point "1" 1 to point "2" 2 follows the wet bulb line 110B to near saturation 122 in the pre-cooling section 12. Fluid (e.g., water) 25 from point "A" 101 to point "B" 102 approaches the dry bulb temperature of the fluid (e.g., air) 42 at point "3" 3 (similar as in a conventional cooling tower). Fluid 26 temperature at point "D" 104 is the mixed temperature of the fluid (e.g., water) 25 at point "C" 103 and the fluid (e.g., water) 26 returning from pre-cooling at point "E" 105 (tower sump). The fluid 26 temperature at point "E" 105 approaches the wet bulb temperature of the fluid (e.g., air) 43 at point "3" 3. The fluid (e.g., water) 25 at point "F" 106 is the mixed temperature, almost the same as that of the fluid (e.g., water) 26 at point "D" 104.

The cooling tower 10 and its components illustratively may be fashioned in any suitable size and shape, from any suitable materials by any suitable method of manufacture.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An apparatus for cooling a fluid comprising:
   a pre-cooling chamber including an inlet side and an outlet side opposite the inlet side;
   a main tower including an inlet side and an outlet side opposite the inlet side;
   a main sump disposed generally below and in fluid communication with the main tower;
   the main sump also being disposed generally below and in fluid communication with the pre-cooling chamber;
   a spray pump in fluid communication with the main sump;
   a series of spray fluid piping in fluid communication with the spray pump and with the pre-cooling chamber;
   a fluid reservoir disposed generally above and in fluid communication with the main tower; and
   a fluid outlet disposed generally above the main tower and the pre-cooling chamber;
   wherein the pre-cooling chamber outlet side and the main tower inlet side are disposed in a generally side by side relationship in fluid communication with one another;
   wherein the fluid outlet and the pre-cooling chamber are in fluid communication with one another;
   wherein the fluid outlet and the main tower are in fluid communication with one another;
   wherein the pre-cooling chamber precools an unblocked cooling fluid flowing therethrough from the pre-cooling chamber inlet side generally transversely across to the pre-cooling chamber outlet side through a heat exchange with a pre-cooling fluid spray delivered generally downwardly and cross-wise to the generally transversely flowing unblocked cooling fluid, and with the pre-cooling fluid spray being separated from the generally transversely flowing unblocked cooling fluid, and wherein the pre-cooling chamber precools a blocked cooling fluid flowing upward toward the fluid outlet and the blocked cooling fluid is cooled directly by pre-cooling fluid spray delivered generally downwardly;

wherein the pre-cooling chamber and the main tower are positioned to allow the unblocked cooling fluid to flow generally transversely between the pre-cooling chamber outlet side and the main tower inlet side;

wherein the main tower is configured to allow the unblocked cooling fluid to flow therethrough from the main tower inlet side generally transversely across to the main tower outlet side in order to cool a fluid to be cooled delivered from the fluid reservoir generally downwardly and cross-wise to the generally transversely flowing unblocked cooling fluid; and wherein the fluid outlet is configured to draw the unblocked cooling fluid therethrough.

2. The apparatus of claim 1 further comprising:
a circulating pump in fluid communication with the main sump;
a fluid delivery pipe in fluid communication with the circulating pump; and
a fluid return pipe in fluid communication with the fluid reservoir.

3. The apparatus of claim 2 further comprising:
a second pre-cooling chamber including a second pre-cooling chamber inlet side and a second pre-cooling chamber outlet side opposite the second pre-cooling chamber inlet side;
a second main tower including a second main tower inlet side and a second main tower outlet side opposite the second main tower inlet side;
a second series of spray fluid piping in fluid communication with the spray pump and with the second pre-cooling chamber; and
a second fluid reservoir disposed generally above and in fluid communication with the second main tower and in fluid communication with the fluid return pipe;
wherein the fluid outlet is disposed generally above the second main tower and the second pre-cooling chamber;
wherein the second pre-cooling chamber outlet side and the second main tower inlet side are disposed in a generally side by side relationship in fluid communication with one another;
wherein the main tower outlet side and the second main tower outlet side are disposed generally in a side by side relationship;
wherein the main sump is disposed generally below and in fluid communication with the second main tower;
wherein the main sump is disposed generally below and in fluid communication with the second pre-cooling chamber;
wherein the fluid outlet and the second pre-cooling chamber are in fluid communication with one another;
wherein the fluid outlet and the second main tower are in fluid communication with one another;
wherein the second pre-cooling chamber is configured to pre-cool a second cooling fluid flowing therethrough from the second pre-cooling chamber inlet side generally transversely across to the pre-cooling outlet side through a heat exchange with a second pre-cooling fluid spray delivered generally downwardly and cross-wise to the generally transversely flowing second cooling fluid;
wherein the second pre-cooling chamber and the second main tower are positioned to allow the second cooling fluid to flow generally transversely between the second pre-cooling chamber outlet side and the second main tower inlet side;
wherein the second main tower is configured to allow the second cooling fluid to flow therethrough from the second main tower inlet side generally transversely across to the second main tower outlet side in order to cool a second fluid to be cooled delivered from the second fluid reservoir generally downwardly and cross-wise to the generally transversely flowing second cooling fluid; and
wherein the fluid outlet is configured to draw the second cooling fluid therethrough.

4. The apparatus of claim 3 further comprising a second spray pump in fluid communication with the main sump and in fluid communication with the second series of spray fluid piping.

5. The apparatus of claim 3 further comprising a first auxiliary sump disposed below and in fluid communication with the first said pre-cooling chamber and a second auxiliary sump disposed below and in fluid communication with the second pre-cooling chamber, the first and second auxiliary sumps each being disposed generally above and in fluid communication with the main sump.

6. The apparatus of claim 5 further comprising a heat exchange system having a first end disposed generally above and in fluid communication with the first said pre-cooling chamber and a second end disposed generally above the first said main tower, the second end being in fluid communication with the first said reservoir.

7. The apparatus of claim 6 further comprising a second heat exchange system having a first end disposed generally above and in fluid communication with the second pre-cooling chamber and a second end disposed generally above the second main tower, the second end being in fluid communication with the second reservoir.

8. The apparatus of claim 7 further comprising a first pre-cooler fan disposed generally above and in fluid communication with the first pre-cooling chamber.

9. The apparatus of claim 8 further comprising a second pre-cooler fan disposed generally above and in fluid communication with the second pre-cooling chamber.

10. The apparatus of claim 9 wherein the first and second heat exchange systems comprise a heat pipe system.

11. The apparatus of claim 9 wherein the first and second heat exchange systems comprise a run-around coil system.

12. The apparatus of claim 9 wherein the first heat exchange system is chosen from a group consisting of a heat pipe system and a run-around coil system, and the second heat exchange system is chosen from a group consisting of a heat pipe system and a run-around coil system.

13. The apparatus of claim 12 wherein the first pre-cooling chamber and the second pre-cooling chamber each comprises a heat exchanger.

14. The apparatus of claim 13 wherein the heat exchanger comprises a plate and frame heat exchanger having a series of plates.

15. The apparatus of claim 14 wherein the first main tower and the second main tower each comprises a heat exchanger having a fill media.

16. The apparatus of claim 15 further comprising:
a fluid to be cooled delivered by the fluid return pipe to each of the first reservoir and the second reservoir;
the fluid to be cooled is delivered from the first reservoir and second reservoir downwardly to the respective first and second main towers generally cross-wise to a generally transverse flow path defined through each of the respective first and second main towers;
wherein the fluid to be cooled is collected in the main sump as a circulating cooling fluid and delivered by the circulating pump to the fluid delivery pipe; and
wherein the spray pump delivers the circulating cooling fluid to each of the first and second pre-cooling chambers as a pre-cooling fluid delivered generally downwardly and cross-wise to at least a portion of the cooling fluid drawn into and generally transversely through each of the first and second pre-cooling chambers from the respective inlet side generally across to the respective outlet side thereby sensibly cooling the cooling fluid;

wherein the generally transversely flowing portion of the cooling fluid is drawn generally transversely out through the respective pre-cooling chamber outlet sides and into the respective inlet sides of each of the first and second main towers and continues flowing transversely across to the respective outlet sides of the first and second main towers generally transversely and cross-wise to the downwardly flowing fluid to be cooled, thereby evaporatively cooling the fluid to be cooled; and wherein the cooling fluid is drawn upwardly and outwardly through the fluid outlet.

17. The apparatus of claim 16 wherein the cooling fluid comprises a gas, the fluid to be cooled comprises a liquid, and the pre-cooling fluid comprises a liquid, and the gas is in generally a cross-flow relationship with the liquids.

18. The apparatus of claim 17 wherein the gas comprises air and the liquids each comprise water.

* * * * *